US010620380B1

(12) United States Patent
Lin

(10) Patent No.: US 10,620,380 B1
(45) Date of Patent: Apr. 14, 2020

(54) CAMERA MODULE WITH NON-MECHANICAL LIGHT-BLOCKING AND LIGHT-PASSING FUNCTION AND ELECTRONIC DEVICE USING THE CAMERA MODULE

(71) Applicant: NANNING FUGUI PRECISION INDUSTRIAL CO., LTD., Nanning (CN)

(72) Inventor: Chia-Shih Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/179,787

(22) Filed: Nov. 2, 2018

(51) Int. Cl.
*G03B 9/00* (2006.01)
*G03B 11/04* (2006.01)
*G02B 6/35* (2006.01)

(52) U.S. Cl.
CPC ............ *G02B 6/3538* (2013.01); *G03B 9/00* (2013.01); *G03B 11/043* (2013.01)

(58) Field of Classification Search
CPC ..................................... G03B 11/04
See application file for complete search history.

(56) References Cited

FOREIGN PATENT DOCUMENTS

| CN | 104765162 A | 7/2015 |
| CN | 107127345 A | 9/2017 |
| TW | 201351976 A | 12/2013 |
| WO | 2018/164496 A1 | 9/2018 |

*Primary Examiner* — Clayton E. LaBalle
*Assistant Examiner* — Linda B Smith
(74) *Attorney, Agent, or Firm* — ScienBiziP, P.C.

(57) ABSTRACT

A camera module with non-mechanical blocking and non-blocking functions in relation to external light includes a lens, a light sensing element, and a housing. The lens includes interconnected first and second cavity regions, there being gas and/or colored liquid in the first cavity region or the second cavity region. The colored liquid exists in the first cavity region during a first state and, by the application of fingertip heat, in the second cavity region only during the second state, or the reverse. The light sensing element can receive or not receive external light representing images according to user choice. The housing receives the lens and the light sensing element.

16 Claims, 4 Drawing Sheets

//www.w3.org/1999/xlink"
CAMERA MODULE WITH NON-MECHANICAL LIGHT-BLOCKING AND LIGHT-PASSING FUNCTION AND ELECTRONIC DEVICE USING THE CAMERA MODULE

FIELD

The subject matter herein generally relates to cameras.

BACKGROUND

Cameras comprise a cover in front of the lens. The cover covers the lens when the camera is not in use. The cover is opened and closed by a complex mechanism design with gears or rails, which increases design difficulty and wastes space.

Therefore, there is room for improvement within the art.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
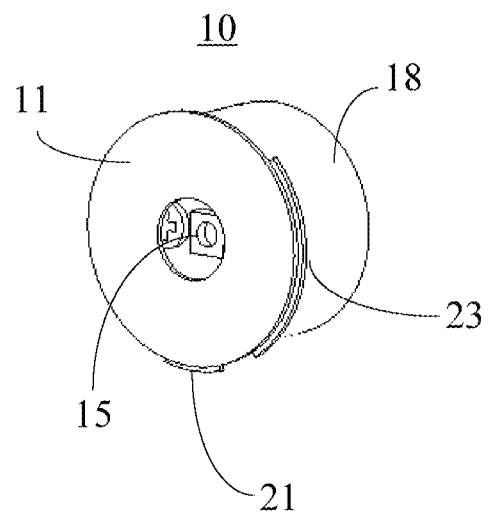
FIG. 1 is a schematic view of a camera module according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
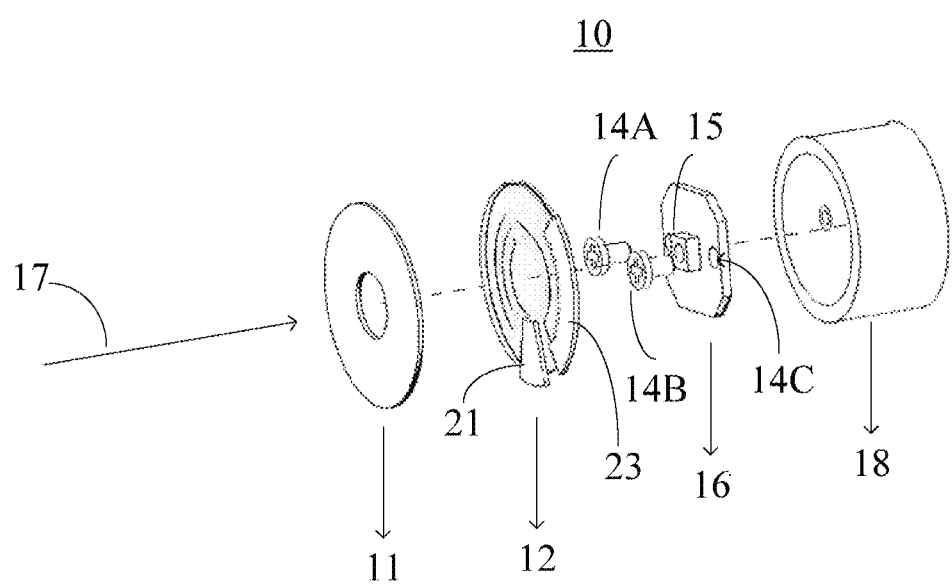
FIG. 2 is an exploded view of a camera module according to an embodiment of the disclosure.

FIG. 1 shows a camera module according to an embodiment of the disclosure and FIG. 2 shows an exploded view. FIGS. 1 and 2 show the camera module 10 comprising front plate 11 and housing 18. The front plate 11 and the housing 18 form a housing space for receiving the lens 12, the light sensing element 15, and the circuit board 16. In an embodiment, the front plate 11 can be a protective sheet. The switching elements 21 and 23 are provided on the lens 12. The detailed structure and related functions of the lens 12 will be described. The light sensing element 15 is positioned on the circuit board 16, receives light and transforms the received lights to signals. The circuit board 16 is received in the housing space formed by the front plate 11 and the housing 18 and comprises a control circuit (not shown in FIGS. 1 and 2). The control circuit triggers the light sensing element 15 according to a signal provided by the switching element 21, and disables the light sensing element 15 according to a signal provided by the switching element 23.

As shown in FIG. 2, the fasteners 14A and 14B lock the circuit board 16 to the locking holes 14C of the housing 18. According to an embodiment of the disclosure, the fasteners 14A and 14B can be screws or pins. The lens 12 is superposed on the circuit board 16, and then the front plate 11 covers the lens 12. The front plate 11, the lens 12, the light sensing element 15, the circuit board 16, and the bottom of the housing 18 are sequentially arranged in the light incident direction 17 shown in FIG. 2.

Figure 3:
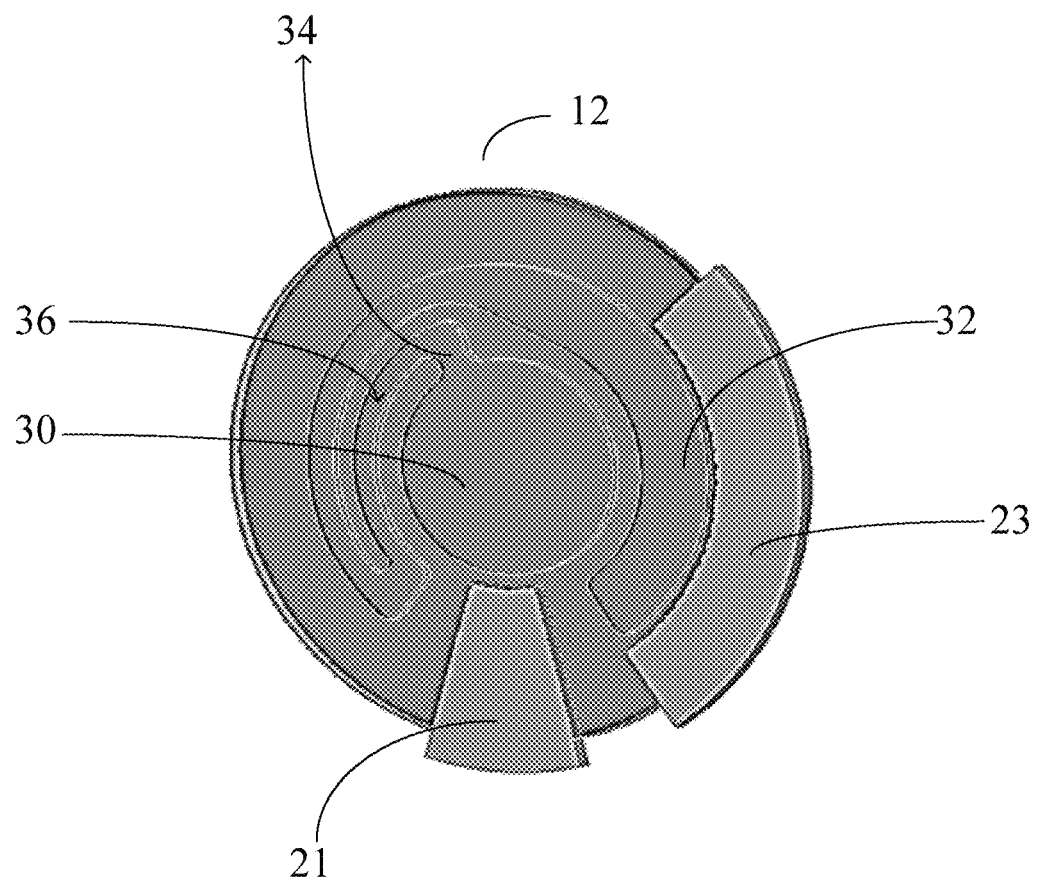
FIG. 3 is a schematic view of a lens of a camera module according to an embodiment of the disclosure.

FIG. 3 shows a lens according to an embodiment of the disclosure. The lens includes a first cavity region 30 and a second cavity region 32 connected to the first cavity region 30. The first cavity region 30 is located on a center of the lens 12, and the second cavity region 32 is located on a periphery of the first cavity region 30. As shown in FIG. 3, the first cavity region 30 has a gap 34 provided on the opposite side from the switching element 21. For example, the gap at a relatively upper part of the lens 12 when the lens 12 is upright. The first cavity region 30 connects to the second cavity region 32 through a twisting channel 36. In an embodiment, the first cavity region 30 and the second cavity region 32 are in a closed space. The closed space can be formed by a transparent cover covering the body of the lens 12. There is gas and/or colored liquid (not shown in FIG. 3) sealed in the closed space enclosing the first cavity region 30 and the second cavity region 32.

The switching elements 21 and 23 are provided on the outer edge of the lens 12 and electrically connected to the control circuit of the circuit board 16. When the user touches the switching elements 21 or 23, electronic signals can be triggered and is sent to the control circuit. According to an embodiment of the disclosure, the switching elements 21 and 23 can be metal pieces or touch sensing elements, or other types of elements that have heat conducting functions. In an embodiment, the switching element 21 is provided adjacent to the first cavity region 30, and the second switching element 23 is provided adjacent to the second cavity region 32. In another embodiment, the switching elements 21 and 23 can be electrically isolated from the circuit board 16 and do not provide electronic signals to the control circuit, as long as the heat is conducted to the first cavity region 30 near the center of the lens 12 or to the second cavity region 32 near the periphery of the lens 12.

As mentioned, gas and/or colored liquid is sealed in the first cavity region 30 and the second cavity region 32. According to Gas Laws, for a fixed mass of gas at constant pressure, the volume is directly proportional to the temperature of the gas. With this characteristic, the position of the colored liquid can be controlled. When the first cavity region 30 or the second cavity region 32 is heated, the thermal expansion (and contraction on cooling) of the gas is much more than that of the liquid. The expanded gas will push the colored liquid to flow, effectively controlling the position of the colored liquid. Thus, the colored liquid exists in the first cavity region 30 in a first state and will exist in the second cavity region 32 only in a second state. It is noted that the surface of the colored liquid is not higher than the height of the gap 34 in the first state. In an embodiment, the colored liquid may be selected from a volatile liquid having a high vapor pressure, so as to increase the efficiency of moving the colored liquid, and a coloring agent may be added to enhance the opacity.

Figure 4A:
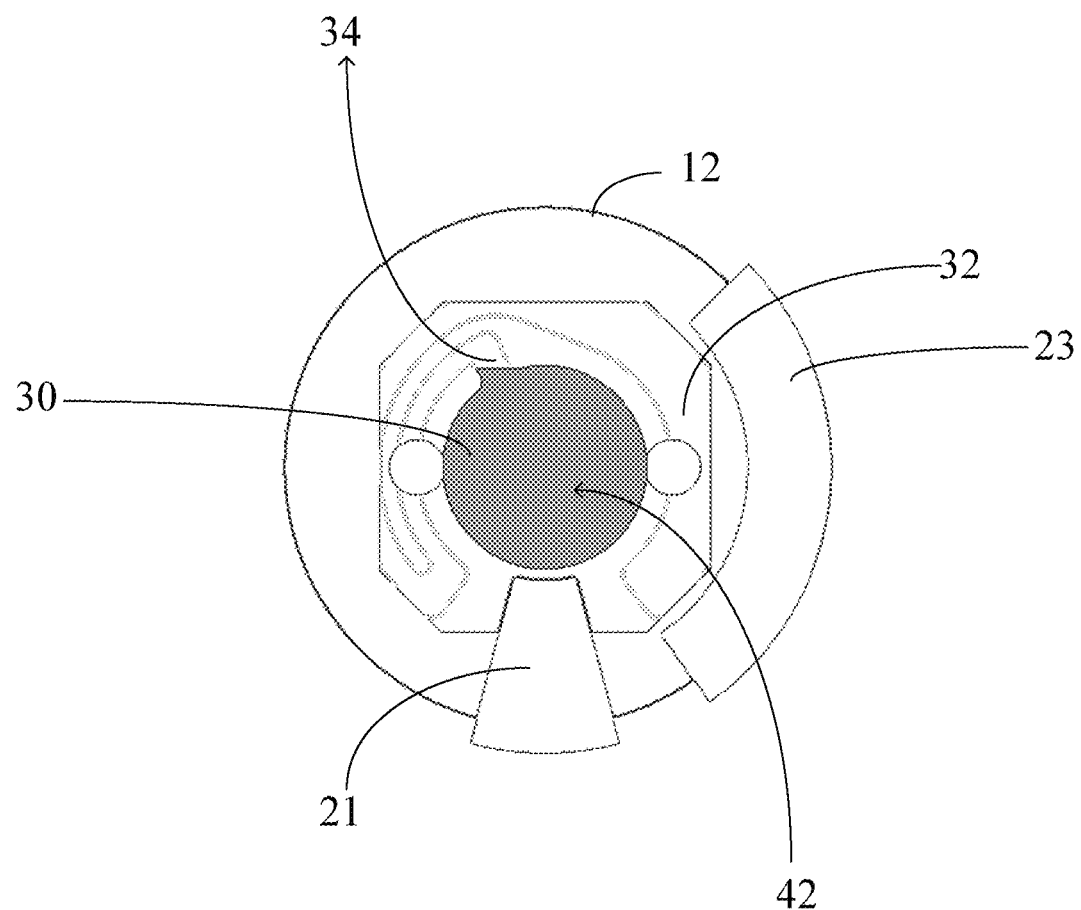
FIG. 4A is a schematic view of the lens of FIG. 3 in a first state according to an embodiment of the disclosure.

FIG. 4A shows the lens in the first state according to an embodiment of the disclosure. In the first state, the colored liquid 42 is located in the first cavity region 30, and the position of the gap 34 ensures that the colored liquid 42 remains in the first cavity region 30 when the lens 12 is upright, e.g., when the switching element 21 is positioned at the bottom. The position of the first cavity region 30 is corresponding to the position of the light sensing element 15. Thus, in the first state, external light is blocked by the colored liquid 42 and none is received by the light sensing element 15.

Figure 4B:
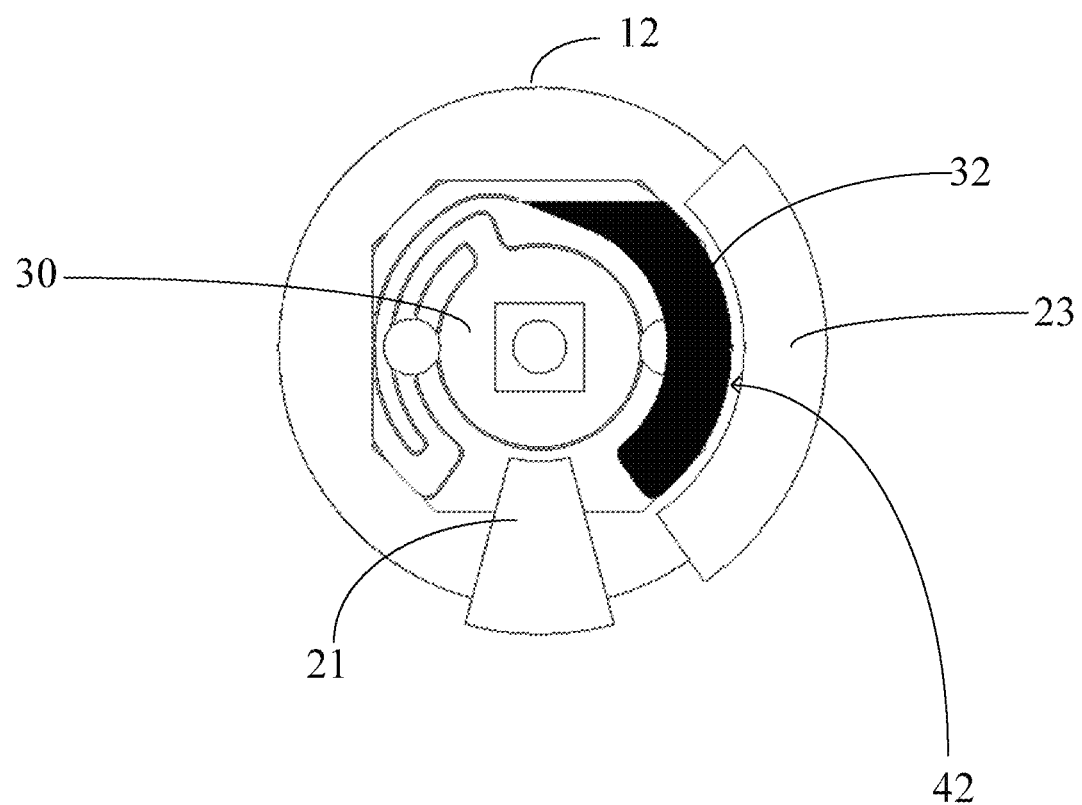
FIG. 4B is a schematic view of the lens of FIG. 3 in a second state according to an embodiment of the disclosure.

FIG. 4B shows the lens in the second state according to an embodiment of the disclosure. In the second state, the colored liquid 42 is located in the second cavity region 32. The position of the first cavity region 30 is corresponding to the position of the light sensing element 15. Thus, in the second state, since the colored liquid 42 is moved to the second cavity region 32, there is no colored liquid 42 in the first cavity region 30, thus external light is not blocked from the light sensing element 15.

When the lens module is in operational condition, as shown in FIG. 4A, the switching element 21 provides a signal to the control circuit of the circuit board 16 to trigger the light sensing element 15 when a user touches the switching element 21. In addition, since transferring of the heat emitted by the user to the switching element 21 heats the gas in the first cavity region 30, and the gas expands to push the colored liquid 42 to flow through to the second cavity region 32. The light sensing element 15 is finally exposed, and is not blocked by the colored liquid 42. Thus, the lens module can receive external light for conversion into image signals, and the colored liquid 42 is maintained in the second state and stays in the second cavity region 32 (as shown in FIG. 4B).

When the user wants to stop using the lens module, the user's finger can touch the switching element 23, and the switching element 23 provides a signal to the control circuit of the circuit board 16 to disable the light sensing element 15. The heat is transferred from the user's finger to the switching element 23 heats the gas in the second cavity region 32, and the gas expands to push the colored liquid 42 to flow through to the first cavity region 30. The light sensing element is finally covered. Thus, the lens module is rendered blind, and the colored liquid 42 is maintained in the first state, staying in the first cavity region 30 (as shown in FIG. 4A). When the ambient temperature changes, since there is gas in the first cavity region 30 and in the second cavity region 32, such gas expands and contracts at the same time to maintain a balance, the colored liquid 42 remaining in its original position without being influenced by variations in external ambient temperature.

According to the embodiments of the disclosure, the lens module can be mounted on an electronic device, which can be a mobile phone, music player, tablet, laptop computing device, wearable electronic device, data storage device, display device, adapter device, desktop computer, digital camera, or other electronic device. To address privacy concerns, the lens module provided by the embodiment of the disclosure can block the field of view of the lens module when not in use.

According to the embodiments of the disclosure, the user can control whether the lens module is shielded by the colored liquid. The manner of shielding the lens module protects against hacking, improving personal privacy security. Furthermore, the lens module according to the embodiment of the disclosure has a simple structure and high reliability, without a complicated mechanical structure, decreasing a thickness and volume of the electronic devices.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprising:
   a lens comprising a first cavity region and a second cavity region connecting to the first cavity region, and colored liquid in the first cavity region or the second cavity region, wherein the colored liquid exists in the first cavity region during a first state and in the second cavity region only during the second state;
   a light sensing element receiving lights and transforming the received lights to image signals; and
   a housing receiving the lens and the light sensing element.

2. The camera module of claim 1, wherein the first cavity region is located around a center of the lens, the second cavity region is located on a periphery of the lens, the first cavity region connects to the second cavity region through a twisting channel, and a gas is sealed in the first cavity region and the second cavity region.

3. The camera module of claim 2, wherein a first switching element and a second switching element are embedded in the lens for triggering electronic signals, and the first cavity region has a gap on an opposite side from the first switching element.

4. The camera module of claim 3, wherein the first switching element is adjacent to the first cavity region, and the second switching element is adjacent to the second cavity region.

5. The camera module of claim 4, wherein the first switching element heats a gas in the first cavity region such that the heated gas expands and pushes the colored liquid in the first cavity region to the second cavity region when a heat source is near the first switching element during the first state.

6. The camera module of claim 5, wherein the second switching element heats the gas in the second cavity region such that the heated gas expands and pushes the colored liquid in the second cavity region to the first cavity region when the heat source is near the second switching element during the second state.

7. The camera module of claim 3, further comprising a circuit board received in the housing for installing the light sensing element, and comprising a control circuit to trigger the light sensing element according to a trigger signal provided by the first switching element, and to disable the light sensing element according to a disable signal provided by the second switching element.

8. The camera module of claim 7, wherein the light sensing element is located between the lens and the circuit board.

9. An electronic equipment comprising:
a first housing; and
a camera module received on the first housing further comprising:
   a lens comprising a first cavity region and a second cavity region connecting to the first cavity region, and colored liquid in the first cavity region or the second cavity region, wherein the colored liquid exists in the first cavity region during a first state and in the second cavity region only during the second state;
   a light sensing element receiving lights and transforming the received lights to image signals; and
   a second housing receiving the lens and the light sensing element.

10. The electronic equipment of claim 9, wherein the first cavity region is located around a center of the lens, the second cavity region is located on a periphery of the first cavity region, the first cavity region connects to the second cavity region through a twisting channel, and a gas is sealed in the first cavity region and the second cavity region.

11. The electronic equipment of claim 10, wherein a first switching element and a second switching element are embedded in the lens for triggering electronic signals, and the first cavity region has a gap on an opposite side from the first switching element.

12. The electronic equipment of claim 11, wherein the first switching element is adjacent to the first cavity region, and the second switching element is adjacent to the second cavity region.

13. The electronic equipment of claim 12, wherein the first switching element heats a gas in the first cavity region such that the heated gas expands and squeezes the colored liquid in the first cavity region to the second cavity region when a heat source is near the first switching element during the first state.

14. The electronic equipment of claim 13, wherein the second switching element heats the gas in the second cavity region such that the heated gas expands and squeezes the colored liquid in the second cavity region to the first cavity region when the heat source is near the second switching element during the second state.

15. The electronic equipment of claim 11, further comprising a circuit board received in the second housing for installing the light sensing element, and comprising a control circuit to trigger the light sensing element according to a trigger signal provided by the first switching element, and to disable the light sensing element according to a disable signal provided by the second switching element.

16. The electronic equipment of claim 15, wherein the light sensing element is located between the lens and the circuit board.

\* \* \* \* \*